United States Patent [19]

Gautier

[11] Patent Number: 4,784,046
[45] Date of Patent: Nov. 15, 1988

[54] BRAKE BOOSTER UNIT MOUNTED ON A FIXED WALL OF A VEHICLE AND PROCESS FOR ASSEMBLING SUCH A UNIT

[76] Inventor: Jean-Pierre Gautier, 46ter Av. Louis Blanc, 93600 Aulnay Sous Bois, France

[21] Appl. No.: 92,838

[22] Filed: Sep. 3, 1987

[30] Foreign Application Priority Data

Sep. 10, 1986 [FR] France ................. 86 12669

[51] Int. Cl.[4] .................. F01B 29/00; F01B 11/02
[52] U.S. Cl. ...................... 92/128; 92/161; 92/169; 248/222.3; 403/348
[58] Field of Search ............. 92/128, 146, 161, 169.1, 92/169.2, 169.3, 169.4; 248/222.3, 223.2; 403/348, 349; 280/661

[56] References Cited

U.S. PATENT DOCUMENTS

| D. 272,392 | 1/1984 | Bigelow .................. 280/661 X |
| 2,496,928 | 2/1950 | Bing et al. ................ 403/348 X |
| 3,312,147 | 4/1967 | Reichard ...................... 91/369 |
| 3,880,546 | 4/1975 | Segal ...................... 403/349 X |

FOREIGN PATENT DOCUMENTS

| 124223 | 11/1984 | European Pat. Off. ............ 92/161 |
| 1512696 | 2/1968 | France . |
| 1536500 | 7/1968 | France . |
| 617576 | 2/1949 | United Kingdom . |

Primary Examiner—Robert E. Garrett
Assistant Examiner—Mark A. Williamson

[57] ABSTRACT

The assembly nut (6) is prescrewed onto the bolt (5) so as to be up against a tubular spacer (15); the bolt, together with its nut and its spacer, is introduced through a first end zone of enlarged cross-section of an elongate orifice made in the fixed wall (4), after which the booster is moved relative to the wall in order to bring the spacer (15) into a second end zone of the orifice in the wall, of a cross-section corresponding to that of the spacer, and then a plate (18) likewise having an elongate orifice with two end zones of different cross-sections is interposed between the wall (4) and the nut (6), the plate being moved in order to place the spacer (15) in the end zone of corresponding cross-section (22) of the orifice in the plate, this movement producing, between the wall (8) and the nut (6), a wedge effect attributable to an edge of variable thickness (24) of the orifice in the plate (18).

5 Claims, 2 Drawing Sheets

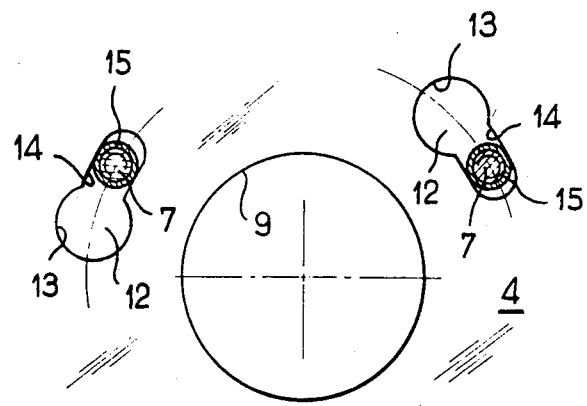
FIG_3
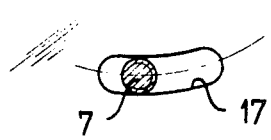
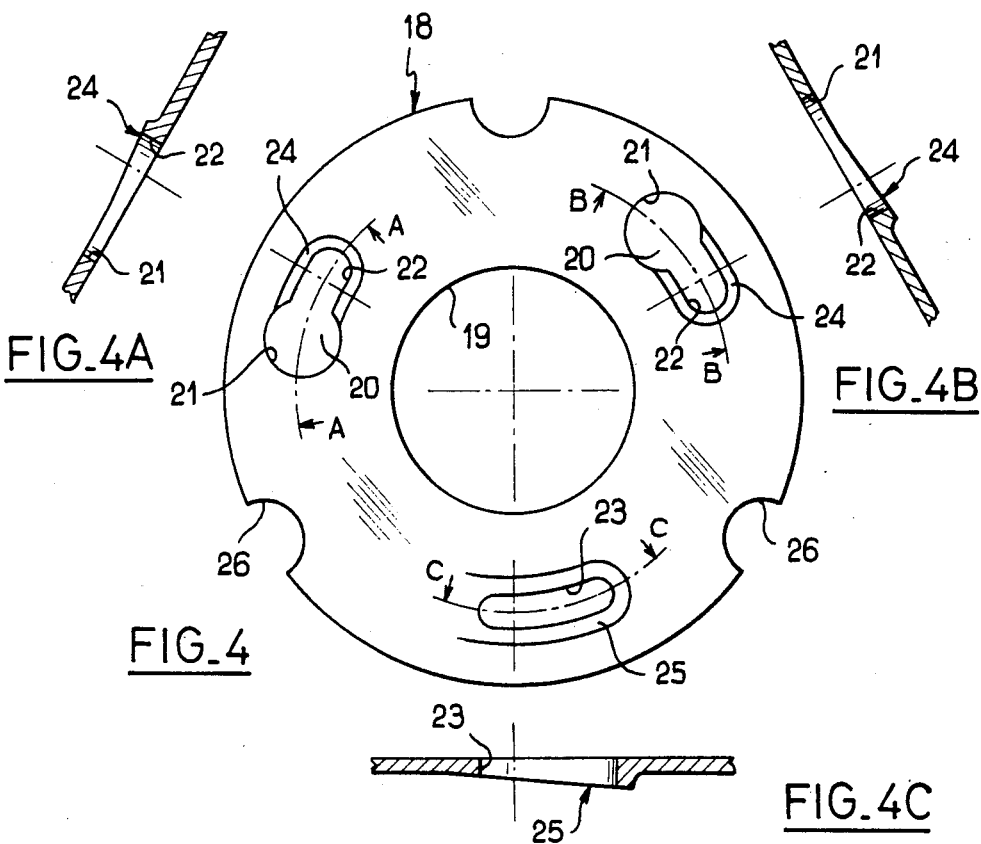
FIG_4A    FIG_4B    FIG_4    FIG_4C

BRAKE BOOSTER UNIT MOUNTED ON A FIXED WALL OF A VEHICLE AND PROCESS FOR ASSEMBLING SUCH A UNIT

The present invention relates to vehicle brake systems and, more particularly, to a brake booster unit mounted on a fixed wall face of a vehicle, possessing at least one assembly bolt, having a head fixed to the booster and a threaded part passing through a first orifice made in the wall, and a nut screwed onto the threaded end of the bolt projecting relative to the other face of the wall.

Conventionally, (see for example, the document U.S. Pat. No. 3,358,449), a brake booster is mounted on the fixed wall of the vehicle by means of at least one bolt, typically at least two assembly bolts, introduced from the engine compartment of the vehicle into corresponding circular orifices made in the fixed wall, after which a nut is screwed onto the threaded end of each bolt projecting from the other side of the fixed wall, typically in the passenger compartment of the vehicle, the bolt being screwed home so as to interact with the other face of the fixed wall by coming up against it axially.

Because of the problems involved in making modern vehicles more compact and of less bulk, it is more and more difficult to gain access to the rear face of the fixed wall which is usually set far back under the dashboard near the central bracket of the latter and the pedal fittings, so that attaching the nut onto the bolt proves long and difficult for the operator and can cause the threads of the nut and/or bolt to be crossed, thus contributing to imperfect and even defective assembly.

It is therefore an object of the invention to overcome these disadvantages by providing a brake booster unit which is mounted on a fixed wall of a vehicle and is of a new design and which avoids the problems of attaching a nut in situ on a virtually inaccessible, indeed totally inaccessible bolt, even by means of a suitable screw-driving or bolt-driving tool.

For this purpose, according to one feature of the invention, the orifice in the fixed wall of the vehicle has an elongate shape with a first end zone of enlarged cross-section, allowing the passage of the nut previously screwed onto the threaded part of the bolt so as to be axially up against a tubular spacer mounted on the bolt, the first end zone of the orifice being connected to a second end zone of a cross-section corresponding to that of the spacer, and an element forming a wedge which can be interposed manually between the other face of the wall and the nut.

According to a more particular feature of the invention, the element forming a wedge is composed of a plate containing a cut-out having an edge interacting with the spacer so as to guide the latter and having a profile of variable thickness.

By means of such an arrangement, at least one of the assembly bolts of the booster, located in an inaccessible region on the same side as the passenger compartment, is previously equipped with its nut and with its spacer, the bolt thus equipped being introduced through the first end zone of the orifice in the wall, the booster subsequently being suitably moved manually in order to bring the spacer into the second end zone of the orifice, after which the element forming a wedge is interposed manually between the other face of the wall and the nut, in order to ensure reliable assembly without axial play in the region of the bolt.

It is another object of the invention to provide a unit of the type in question, which allows rapid and reliable assembly even in large-scale production.

For this purpose, according to another feature of the invention, the cut-out in the plate forming a wedge is made in the form of a first orifice having an elongate shape with a first end zone of enlarged cross-section, allowing the passage of the nut screwed onto the threaded part of the bolt so as to be up against the spacer, and being connected to a second end zone of a cross-section corresponding to that of the spacer, the edge of the orifice having a thickness increasing from the first zone towards the second zone.

According to a more particular feature of the invention, means are provided for immobilizing the plate in the final assembly configuration, these immobilizing means typically consisting of a second elongate orifice which is made in the plate and through which passes another assembly bolt of the booster, extending through a second elongate orifice which is made in the fixed wall in an accessible zone of the latter on the same side as the passenger compartment and which has an edge of a thickness varying in the opposite direction to that of the edge of the first orifice in the plate.

By means of such an arrangement, the conventional method of assembly by screwing a nut onto a bolt on the same side as the passenger compartment can be retained for the bolt located in an easily accessible zone, this nut being screwed up against the edge of the second orifice of the plate, of which the slope in the opposite direction to that of the edge forming a wedge interacting with the nut previously screwed onto the bolt equipped with a spacer prevents any inopportune movement of the plate away from its final assembly configuration previously obtained manually.

The invention will now be described by way of example with reference to the accompanying drawings in which:

FIG. 3 is a diagrammatic view in the plane III—III of FIG. 1;

FIG. 4 is a plan view of the assembly and locking plate; and

FIGS. 4A to 4C are partial sections along the sectional lines A—A, B—B and C—C of FIG. 4.

Figure 1:
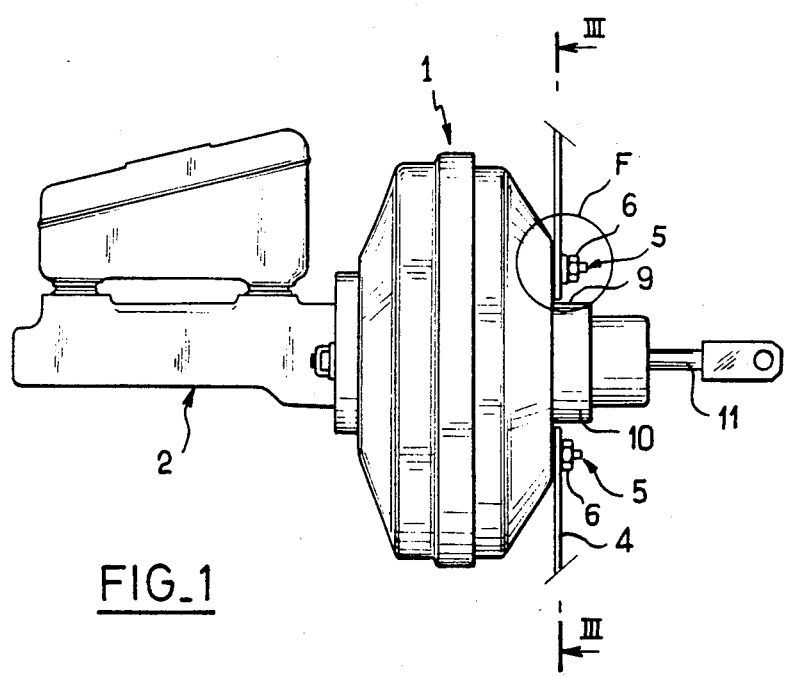
FIG. 1 is a diagrammatic view of a brake booster unit mounted on a fixed vehicle wall.

FIG. 1 shows a conventional mounting of a brake booster of the vacuum type 1 coupled to a brake master cylinder 2 and mounted overhung on the front face 3 of a fixed wall 4 of a vehicle, typically the so-called "fire proof" wall, by means of at least two bolts, typically three bolts 5 fixed to the housing of the booster 1 and each passing through an orifice made in the fixed wall 4, assembly being carried out by means of nuts 6 screwed onto the threaded end of each bolt 5 projecting rearwards relative to the rear face 8 of the wall 4. Conventionally, the wall 4 has a central aperture 9, through which extends a rear bush part 10 of the housing of the booster 1, from which rear bush part 10 projects to the rear an actuating rod 11 extending into the passenger compartment of the vehicle and intended to be coupled to a brake pedal (not shown).

Figure 2:
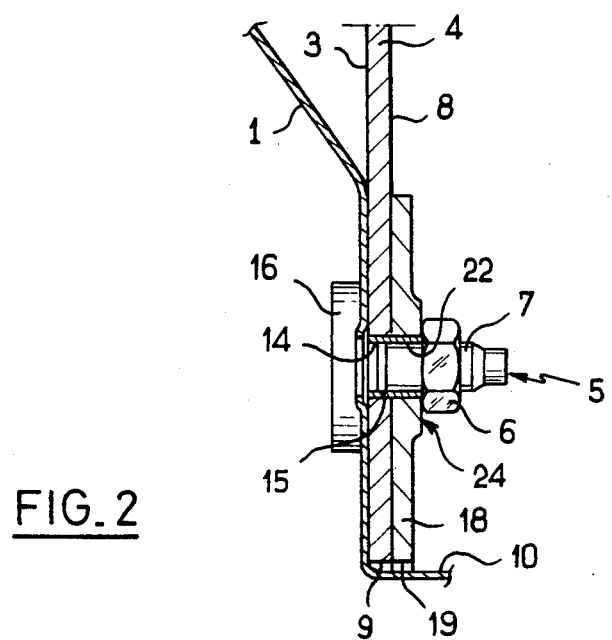
FIG. 2 is a diagrammatic sectional view of the assembly zone F in FIG. 1.

According to the invention, as can be seen in FIGS. 2 and 3, the wall 4 possesses typically in its upper portion, at least one, typically two orifices 12 having an elongate shape, advantageously substantially in the form of an arc of a circle, with a first widened end zone 13 of a cross-section large than the overall cross-section of the nut 6 and connected to a second end zone 14, the cross-section of which corresponds to that of a tubular spacer 15 intended to be fitted previously round the threaded part 7 of the bolt 5, in order to bear at the front against the bolt head 16 fixed to the housing of the booster or against the wall of the latter. The fixed wall 4 likewise possesses, offset angularly relative to the first orifices 12, a second orifice 17 of elongate shape, typically in the form of an arc of a circle, of constant cross-section corresponding to that of the threaded part 7 of the bolts 5.

The unit according to the invention also has an assembly and locking plate 18, typically of annular shape, possessing a central aperture 19 allowing the passage of the bush 10 of the booster and formed, like the wall 4 and with the same angular distribution, with at least one, typically two first orifices 20 which, like the first orifices 12 in the wall 4, each have an elongate shape, advantageously substantially in the form of an arc of a circle, with a first enlarged end zone 21 of a cross-section larger than the overall cross-section of a nut 6 and connected to a second end zone 22, the cross section of which corresponds to that of the spacer 15. The plate 18 likewise has a second orifice 23 of elongate shape, typically in the form of an arc of a circle, which, like the second orifice 17 in the wall 4, has a cross-section corresponding to the cross-section of the threaded part 7 of the bolt 5. According to one aspect of the invention, each first orifice 20 in the plate 18 has an edge 24, the thickness of which varies from the first end zone 21 to the second end zone 22 (that is to say, to the right in FIG. 4), while the second orifice 23 in the plate 18 has an edge 25, the thickness of which varies in the opposite direction to that of the edges 24 (that is to say, to the left in FIG. 4).

The process for assembling the unit according to the invention is as follows: the spacer 15 is previously slipped over the two bolts intended to pass through the first orifices 12 in the wall 4, and then the nut 6 is screwed home so as to be blocked axially up against the spacer, the front face of the nut 6 thus being at a specific distance from the rear face of the housing of the booster 1. The two bolts, each equipped with their spacer 15 and with their nut 6, are then introduced through first end zones 13 of the first orifices 12 in the plate 4, the remaining bolt 7 itself being introduced just as it is through the second orifice 17 in the wall 4. The booster 1 is then rotated to bring the spacers 15 into the second end zones 14 of the first orifices 12 in the wall 4. The plate 18 is then presented on the same side of the passenger compartment, by holding it at its lower end, so as to make the nuts 6 of the bolts 7 equipped with spacers 15 pass through the first end zones 21 of the first orifices 20 in the plate 18, the bare bolt 7 itself passing through the second orifice 23 in the plate 18. The plate 18 is then rotated (to the left in FIG. 4), for example by means of a tool engaging into one of the cut-outs 26 made on the periphery of the plate 18, in order to place the spacers 15 in the second end zones 22 of the first orifices 20 in the plate 18, this movement producing a wedge effect attributable to the edges 24 of these first orifices 20, during the movement of the plate the edges interacting with the spacers so as to guide the latter. Once the wedge effect is obtained in this way, a nut 6 is screwed onto the bare bolt 7, and this bolt comes up against the thinner part of the edge of variable thickness 25 of the second orifice 23 in the plate 18, thus preventing any risk of reducing the wedge effect initially obtained between the edges 24 of the first orifices 20 in the plate 18 and the nut 6, on the one hand, and the rear face 8 of the fixed wall 4, on the other hand.

Although the present invention has been described with reference to a particular embodiment, it is not limited thereby, but on the contrary can have modifications and alternative forms which will be evident to a person skilled in the art, especially as regards the precise respective shapes of the orifices and of the assembly and locking plate.

I claim:

1. A brake booster unit mounted on one face of a fixed wall of a vehicle and possessing at least one assembly bolt having one end fixed to the booster and a threaded part passing through a first orifice in the wall, and a nut screwed onto the threaded part of the bolt projecting relative to the other face of the fixed wall, characterized in that the first orifice in the wall has an elongate shape with a first end zone of enlarged cross-section which allows the passage of the nut which is screwed onto the threaded part of the bolt so as to be axially against a tubular spacer mounted on the bolt, the first end zone being connected to a second end zone of a cross-section corresponding to that of the spacer, and an element forming a wedge being interposed manually between the other face of the wall and the nut, the element forming the wedge comprising a plate possessing a cut-out having an edge interacting with the spacer so as to guide the latter and having a variable thickness, the cut-out in the plate made in the form of a first orifice having an elongate shape with a first end zone of enlarged cross-section which allows the passage of the nut screwed onto the threaded part of the bolt, the first end zone of the first orifice in the plate being connected to a second end zone of a cross-section corresponding to that of the spacer, the edge of the first orifice in the plate having a thickness increasing from the first end zone of the first orifice in the plate toward the second end zone thereof, the unit including means for immobilizing the plate in a final assembly configuration, the immobilizing means comprising a second elongate orifice in the plate and through which passes a second assembly bolt of the booster which extends also through a second elongate orifice in the wall, the second elongate orifice in the plate having an edge of a thickness varying in a direction opposite that of the edge of the first orifice in the plate.

2. The unit according to claim 1, characterized in that the second elongate orifices in the plate and in the fixed wall each have a cross-section corresponding to that of a threaded part of the second assembly bolt.

3. The unit according to claim 2, characterized in that the first orifices and the second elongate orifices in the plate and in the fixed wall each have a general shape in the form of an arc of a circle.

4. A process for assembling a unit according to claim 3, characterized in that the process comprises the following steps:

slipping previously the tubular spacer over the threaded part of the one assembly bolt;

screwing the nut onto said threaded part of the one assembly bolt so that the nut is axially against the spacer;

passing the threaded part of the one assembly bolt carrying the nut and spacer through the first end zone of the first orifice in the fixed wall;

moving the booster relative to the fixed wall in order to bring the spacer into the second end zone of the first orifice in the fixed wall;

placing the plate against the other face of the fixed wall by passing the nut screwed onto the threaded part of the one assembly bolt through the first end zone of the first orifice in the plate; and moving the plate to produce a wedging effect between the other face of the fixed wall and the nut via the edge of the first orifice in the plate.

5. The process for assembling a unit according to claim 4, characterized in that the process includes the subsequent step of screwing onto the second assembly bolt which passes through the second elongate orifices in the plate and in the fixed wall a nut bearing against a thinner part of the edge of the second elongate orifice in the plate.

* * * * *